H. H. HELLAND.
DETACHABLE MUD HOCK OR SPIKE FOR TRACTOR WHEELS.
APPLICATION FILED JULY 9, 1918.
1,368,629. Patented Feb. 15, 1921.
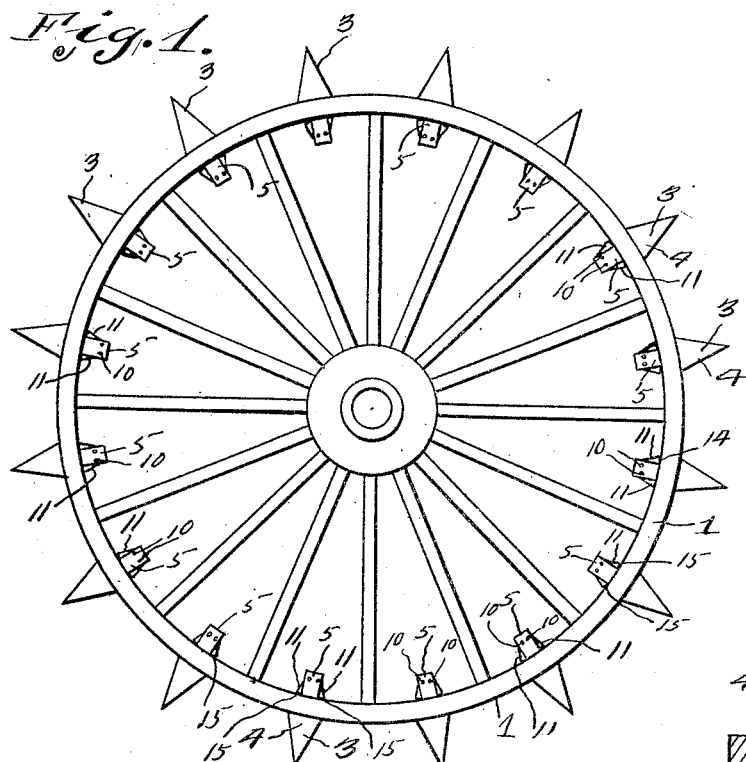
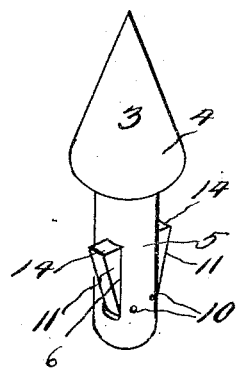
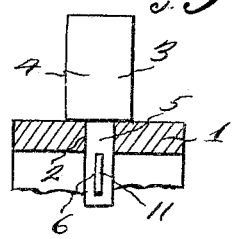
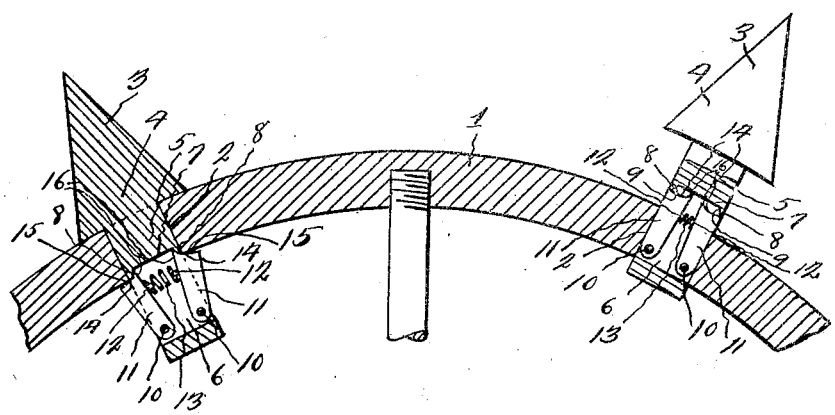
Inventor
H. H. Helland

UNITED STATES PATENT OFFICE.

HERMAN H. HELLAND, OF PETERSBURG, NORTH DAKOTA.

DETACHABLE MUD HOCK OR SPIKE FOR TRACTOR-WHEELS.

1,368,629.  Specification of Letters Patent.  Patented Feb. 15, 1921.

Application filed July 9, 1918. Serial No. 244,013.

*To all whom it may concern:*

Be it known that I, HERMAN H. HELLAND, a citizen of the United States, residing at Petersburg, in the county of Nelson, State of North Dakota, have invented a new and useful Detachable Mud Hock or Spike for Tractor-Wheels; and I do hereby declare the following to be a full, clear, and exact description of the invention, such as will enable others skilled in the art to which it appertains to make and use the same.

This invention relates to an improved detachable mud spike or hock for the rims of tractor wheels, and the invention aims to provide a device of this kind which may be easily and quickly attached or detached.

The invention further aims to provide self locking means, to spring into locking engagement with the inner surface of the rim of the wheel after the spike or hock has been inserted through the rim, to hold the same secure, and rigidly or firmly in position.

The invention further aims to provide a spike or hock, the base of which is larger than the stem, so that the spike may have a firm reinforcing contact with the rim of the wheel, to offset the strains to which the spike may be subjected.

The invention further aims to provide means to limit the locking members in their outward movements.

In practical fields the details of construction may necessitate alterations falling within the scope of what is claimed.

The invention comprises further features and combination of parts as hereinafter set forth, shown in the drawings and claimed.

In the drawings:—

Figure 1 is a view in elevation of a tractor wheel, showing a plurality of spikes or hocks applied thereto.

Fig. 2 is a sectional view through a segment of the rim of the wheel showing the application of two of the spikes, one in locked position and the other partially inserted through the rim.

Fig. 3 is a detail transverse sectional view through a portion of the rim showing a rectangular shaped hock applied thereto, the shank of said hock being of the same construction as shown in Figs. 1 and 2.

Fig. 4 is a detail view of a spike which is conical and provided with a cylindrical shank.

Referring more especially to the drawings 1 designates a rim of a tractor wheel, and provided with a plurality of cylindrical openings 2 intermediate the spokes of the wheel, and 3 denotes the tractor wheel spikes or hocks. These spikes may be conical, rectangular, or any other suitable shape preferably wedge or tapered shape in cross section. Each spike comprises its body 4, and the shank 5, which is cylindrical, as shown in Fig. 4, but which may be of any other suitable shape in cross section, preferably square, as shown in Figs. 1, 2 and 3, in which case the shank is prevented from turning in its opening 2. The shank is provided with a transverse slot 6, one wall 7 of which at its ends is provided with lugs or abutments 8, thereby providing shoulders 9. Pivoted in the slot 6 on transverse pins 10 are locking members or latches 11 the adjacent edge faces of which are provided with lugs or pins 12, for holding the expansion spring 13 in place between the locking members. This spring 13 expands, thereby throwing the locking members outwardly, so that their end edges 14 will wedge in contact with the inner face of the wheel rim as indicated at 15, to lock the shank securely in the opening 2. The end edges 14 of the locking members also have lugs 16 to contact with the shoulders 9, to limit the locking members in their outward movements, when engaging the rim. This form of locking means may be applied to any shank, either a bolt shank or the like. For instance the body or the spike may be in the form of a flat head or bolt head, in which case the structure of the form shown in Fig. 4 would be practically a bolt.

The invention having been set forth what is claimed as new and useful is:—

The combination with a wheel rim having a series of apertures therein, of a headed lug having a shank adapted to be received in one of said apertures, the under side of the lug being transversely concaved concentrically with the periphery of the wheel rim, said shank at a point spaced from the lug and of a distance equal to the thickness of the rim being provided with a transverse slot, said slot having its end adjacent the lug recessed, thereby forming limiting lugs adjacent the side edges of the shank slot, a pair of dogs pivoted within the transverse slot, the pivotal points of said dogs being spaced from each other and located adjacent the sides of the slot and also adjacent its outer ends, said dogs having their free ends provided with limiting lugs, said limiting lugs being located on the adjacent inner faces of the dogs and disposed in the recess adjacent the lug, the ends of the pivoted dogs from their limiting lugs outwardly being inclined so as to bind against the inner periphery of the wheel rim adjacent its aperture, thereby accommodating the variations in thickness of wheel rims and in combination with the transverse concavities in the under faces of the lugs preventing pivotal movement of the headed lug, lugs carried on the inner adjacent edges of the pivoted dogs and a coiled spring disposed between said pivoted dogs and having its ends disposed over the lugs of the pivoted dogs so as to prevent displacement of said spring.

In testimony whereof I have signed my name to this specification in the presence of two subscribing witnesses.

HERMAN H. HELLAND.

Witnesses:
P. E. JOHNSON,
L. B. RAY.